(12) United States Patent
Fujimaki et al.

(10) Patent No.: US 10,787,147 B2
(45) Date of Patent: Sep. 29, 2020

(54) AIRBAG APPARATUS

(71) Applicant: HONDA MOTOR CO., LTD., Minato-ku, Tokyo (JP)

(72) Inventors: Takeshi Fujimaki, Wako (JP); Shigeo Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 113 days.

(21) Appl. No.: 16/127,284

(22) Filed: Sep. 11, 2018

(65) Prior Publication Data

US 2019/0077358 A1    Mar. 14, 2019

(30) Foreign Application Priority Data

Sep. 14, 2017   (JP) ................................. 2017-176770

(51) Int. Cl.
*B60R 21/239* (2006.01)
*B60R 21/203* (2006.01)
*B60R 21/2338* (2011.01)

(52) U.S. Cl.
CPC .......... *B60R 21/239* (2013.01); *B60R 21/203* (2013.01); *B60R 21/2338* (2013.01); *B60R 2021/2395* (2013.01); *B60R 2021/23382* (2013.01)

(58) Field of Classification Search
CPC . B60R 21/203; B60R 21/2338; B60R 21/239; B60R 2021/23382; B60R 2021/2395
See application file for complete search history.

(56) References Cited

U.S. PATENT DOCUMENTS

| 5,246,250 | A  | * | 9/1993  | Wolanin ................ | B60R 21/239 251/294 |
| 6,676,158 | B2 | * | 1/2004  | Ishikawa ............... | B60R 21/233 280/743.1 |
| 6,773,030 | B2 | * | 8/2004  | Fischer ................. | B60R 21/233 280/739 |
| 6,832,778 | B2 | * | 12/2004 | Pinsenschaum ...... | B60R 21/233 280/739 |
| 7,261,319 | B2 | * | 8/2007  | DePottey ............ | B60R 21/2338 280/739 |
| 7,458,607 | B2 | * | 12/2008 | Abe ...................... | B60R 21/233 280/739 |
| 7,475,906 | B2 | * | 1/2009  | Goto ................... | B60R 21/2338 280/738 |
| 7,481,456 | B2 | * | 1/2009  | Nozaki ................ | B60R 21/239 280/731 |
| 7,497,467 | B2 | * | 3/2009  | Chida .................. | B60R 21/239 280/739 |

(Continued)

FOREIGN PATENT DOCUMENTS

JP   07329697 A  * 12/1995
JP   09-249085       9/1997

(Continued)

*Primary Examiner* — Laura Freedman
(74) *Attorney, Agent, or Firm* — Amin, Turocy & Watson, LLP

(57) ABSTRACT

An airbag apparatus includes: a cover that covers a vent hole which is formed on an airbag bag body from an inner part of the airbag bag body; a fixation part that supports the cover movably; and a strap that is connected to the cover, wherein a width of the strap is smaller than a diameter of the vent hole.

2 Claims, 10 Drawing Sheets

(56) References Cited

U.S. PATENT DOCUMENTS

| | | | | |
|---|---|---|---|---|
| 7,845,681 B2* | 12/2010 | Abe | B60R 21/233 | 280/736 |
| 7,925,403 B2* | 4/2011 | Kumagai | B60R 21/0134 | 180/271 |
| 8,308,191 B2* | 11/2012 | Hiruta | B60R 21/239 | 280/736 |
| 8,382,154 B2* | 2/2013 | Suzuki | B60R 21/239 | 280/739 |
| 8,419,055 B2* | 4/2013 | Chida | B60R 21/239 | 280/731 |
| 8,500,164 B2* | 8/2013 | Mendez | B60R 21/205 | 280/739 |
| 8,690,185 B2* | 4/2014 | Yamaji | B60R 21/233 | 280/729 |
| 8,727,378 B2* | 5/2014 | Hiruta | B60R 21/203 | 280/739 |
| 9,027,956 B2* | 5/2015 | Yamaji | B60R 21/203 | 280/729 |
| 9,050,942 B2* | 6/2015 | Ishiguro | B60R 21/239 | |
| 9,079,559 B2* | 7/2015 | Iwamoto | B60R 21/239 | |
| 9,199,601 B2* | 12/2015 | Yamaji | B60R 21/239 | |
| 9,340,177 B2* | 5/2016 | Hiruta | B60R 21/239 | |
| 9,650,012 B2* | 5/2017 | Ishiguro | B60R 21/2338 | |
| 10,647,287 B2* | 5/2020 | Komatsu | B60R 21/2338 | |
| 2005/0225065 A1* | 10/2005 | Fujll | B60R 21/233 | 280/743.2 |
| 2012/0074677 A1* | 3/2012 | Hiruta | B60R 21/2338 | 280/739 |
| 2016/0167615 A1* | 6/2016 | Hiruta | B60R 21/2342 | 280/739 |

FOREIGN PATENT DOCUMENTS

| | | | | | |
|---|---|---|---|---|---|
| JP | 2006347354 | A | * | 12/2006 | |
| JP | 2009006874 | A | * | 1/2009 | B60R 21/239 |
| JP | 2009035055 | A | * | 2/2009 | B60R 21/239 |
| JP | 2009119891 | A | * | 6/2009 | |
| JP | 2009143483 | A | * | 7/2009 | B60R 21/239 |
| JP | 2012011870 | A | * | 1/2012 | |
| JP | 2012061982 | A | * | 3/2012 | |
| JP | 2012166685 | A | * | 9/2012 | |
| JP | 2013086707 | A | * | 5/2013 | B60R 21/2334 |

* cited by examiner

AIRBAG APPARATUS

CROSS-REFERENCE TO RELATED APPLICATION

Priority is claimed on Japanese Patent Application No. 2017-176770, filed on Sep. 14, 2017, the contents of which are incorporated herein by reference.

BACKGROUND

Field of the Invention

The present invention relates to an airbag apparatus.

Background

An airbag apparatus is formed such that, for example, when an impact is input to a vehicle, an airbag bag body is inflated and expanded to the inside of a vehicle room by a gas that is supplied from an inflator, and an occupant is restrained. As an airbag apparatus, one such apparatus is known in which a vent hole is opened on an airbag bag body, the vent hole is covered by a cover, and a tether (hereinafter, referred to as a strap) is connected to the cover.

According to this airbag apparatus, when the airbag bag body is inflated and expanded, by covering the vent hole by the cover, it is possible to prevent the gas from flowing out from the vent hole and allow the airbag bag body to be promptly inflated. Further, the strap is attached to the airbag bag body, and thereby, it is possible to favorably keep the shape of the inflated and expanded airbag bag body.

On the other hand, at the end time of the inflation and expansion of the airbag bag body, the strap is pulled in accordance with the inflation and expansion of the airbag bag body. By pulling the cover by the strap, the cover is separated from the vent hole, and the vent hole is opened. Therefore, when the inflated and expanded airbag bag body receives an impact force externally, by allowing the gas of the airbag bag body to escape via the vent hole to the outside, the impact energy is absorbed. Thereby, the occupant is restrained by the inflated and expanded airbag bag body (for example, refer to Japanese Patent Application, Publication No. H9-249085).

SUMMARY

Among airbag apparatuses, an apparatus is known in which a cover is movably attached to an airbag bag body, a vent hole is covered by the cover, and a strap is connected to the cover.

In this airbag apparatus, when the inflated and expanded airbag bag body receives an impact force externally, by loosening the strap and allowing the cover to escape from the vent hole to the outside, the vent hole is opened.

In this airbag apparatus, the strap is connected to the cover. Accordingly, it is conceivable that, when allowing the cover to escape from the vent hole to the outside, the strap together with the cover is pushed out to the outside from the vent hole. Therefore, it is conceivable that it is difficult to preferably open the vent hole, and from this point of view, there is room for improvement.

An aspect of the present invention provides an airbag apparatus capable of favorably open a vent hole when restraining an occupant by an inflated and expanded airbag bag body.

An aspect of the present invention is an airbag apparatus in which an airbag bag body is inflated and expanded by a gas that is supplied from an inflator, the apparatus including: a cover that covers a vent hole which is formed on the airbag bag body from an inner part of the airbag bag body; a fixation part that supports the cover movably; and a strap that is connected to the cover, wherein a width of the strap is smaller than a diameter of the vent hole.

In this way, the width of the strap is made smaller than the diameter of the vent hole. Accordingly, even when the strap is pushed out together with the cover from the vent hole to the outside, it is possible to prevent the vent hole from being closed by the strap. That is, it is possible to favorably open the vent hole.

Thereby, when restraining an occupant by the inflated and expanded airbag bag body, it is possible to allow the gas of the airbag bag body to favorably escape via the vent hole to the outside, and it is possible to absorb the impact energy by the airbag bag body and favorably restrain the occupant.

In the airbag apparatus described above, the strap may be reinforced by a reinforcement cloth.

In this way, a narrow width part of the strap is reinforced by the reinforcement cloth. Accordingly, it is possible to prevent the narrow width part of the strap from being damaged or being broken when the airbag bag body is inflated and expanded. Thereby, it is possible to favorably secure the shape of the inflated and expanded airbag bag body by the strap, and it is possible to favorably restrain the occupant by the airbag bag body.

In the airbag apparatus described above, the strap may be connected to an end part in a movement direction of the cover.

It is conceivable that, when the cover is pushed out from the vent hole to the outside, the end part in the movement direction of the cover is pushed out from the vent hole to the outside. Therefore, it is conceivable that the strap which is connected to the end part in the movement direction of the cover is pushed out from the vent hole to the outside.

Therefore, the narrow width part of the strap is connected to the end part in the movement direction of the cover. Thereby, even when the narrow width part of the strap is pushed out from the vent hole to the outside together with the cover, it is possible to favorably open the vent hole.

In the airbag apparatus described above, the strap may be a plurality of straps.

In this way, by providing a plurality of straps, it is possible to further favorably ensure the strength of the strap. Further, since a space is ensured between the plurality of straps, even when the plurality of straps are pushed out from the vent hole to the outside together with the cover, it is possible to prevent the vent hole from being closed by the plurality of straps. That is, it is possible to allow the vent hole to be favorably opened.

Another aspect of the present invention is an airbag apparatus in which an airbag bag body is inflated and expanded by a gas that is supplied from an inflator, the apparatus including: a cover that covers a vent hole which is formed on the airbag bag body from an inner part of the airbag bag body; a fixation part that supports the cover movably; and a strap that is connected to the cover, wherein a slit that extends in an extension direction of the strap is formed on the strap.

In this way, by forming the slit on the strap, it is possible to allow the vent hole to be further favorably opened by the slit when the strap is pushed out from the vent hole to the outside.

Thereby, when restraining an occupant by the inflated and expanded airbag bag body, it is possible to allow the gas of the airbag bag body to favorably escape via the vent hole to the outside, and it is possible to absorb the impact energy by the airbag bag body and favorably restrain the occupant.

According to an aspect of the present invention, the width of the strap is made smaller than the diameter of the vent hole. Thereby, when restraining an occupant by the inflated and expanded airbag bag body, it is possible to allow the vent hole to be favorably opened.

DESCRIPTION OF THE EMBODIMENTS

Figure 1:
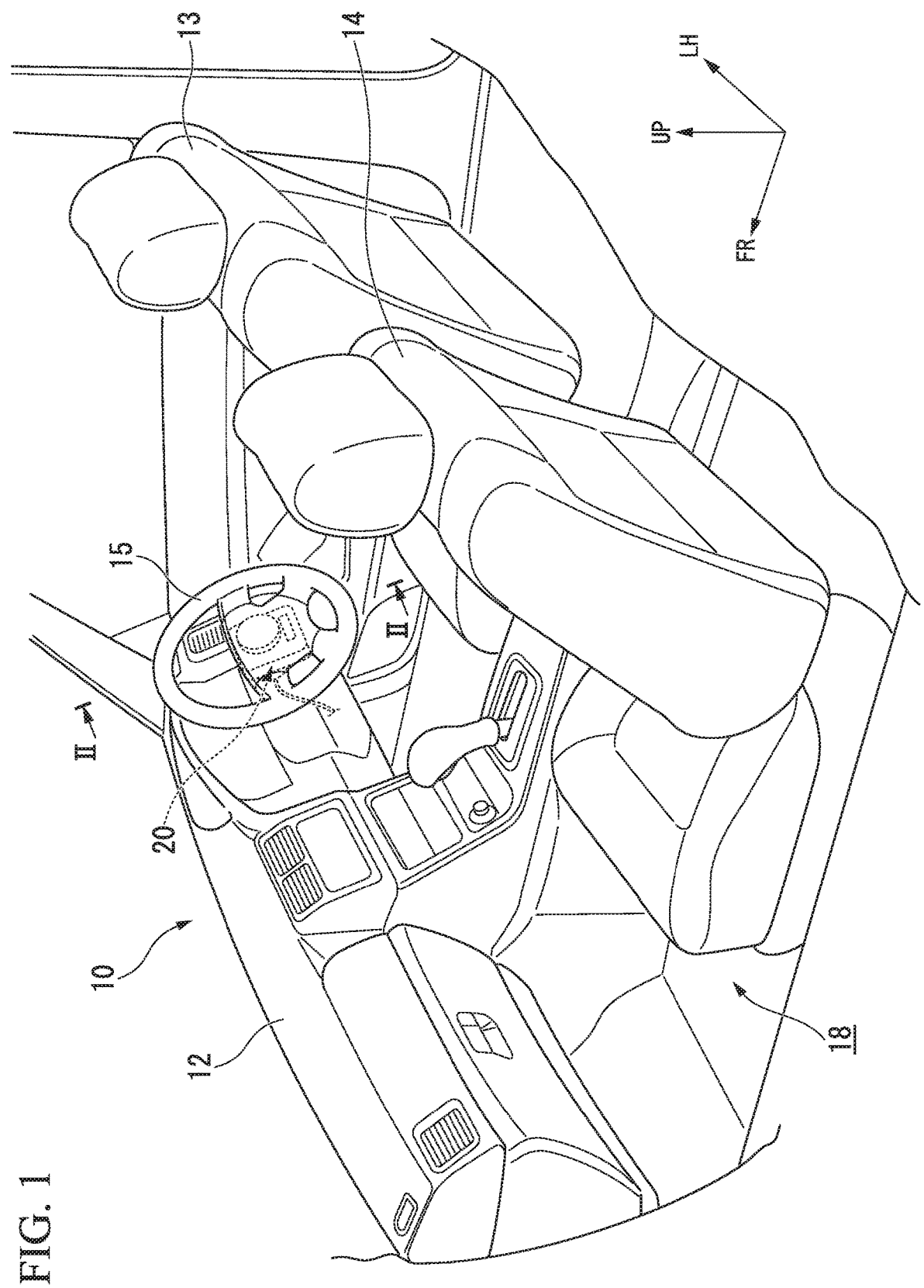
FIG. 1 is a perspective view showing a vehicle that includes an airbag apparatus according to an embodiment of the present invention.

An embodiment of the present invention will be described with reference to the drawings. In the drawings, an arrow FR indicates a frontward direction of a vehicle, an arrow UP indicates an upward direction of the vehicle, and an arrow LH indicates a leftward direction of the vehicle. An embodiment is described using an example of a vehicle 10 in which a driver seat 13 on the driver's side is arranged on a right side of the vehicle, and a passenger seat 14 on the passenger's side is arranged on a left side of the vehicle.

As shown in FIG. 1, the vehicle 10 includes an instrument panel 12, the driver seat 13, the passenger seat 14, a steering wheel 15, and an airbag apparatus 20.

The instrument panel 12 is provided at a vehicle body frontward part of a vehicle room 18. The driver seat 13 and the passenger seat 14 are provided at a vehicle body rearward part of the instrument panel 12. The steering wheel 15 is provided at a vehicle body frontward part of the driver seat 13.

Figure 2:
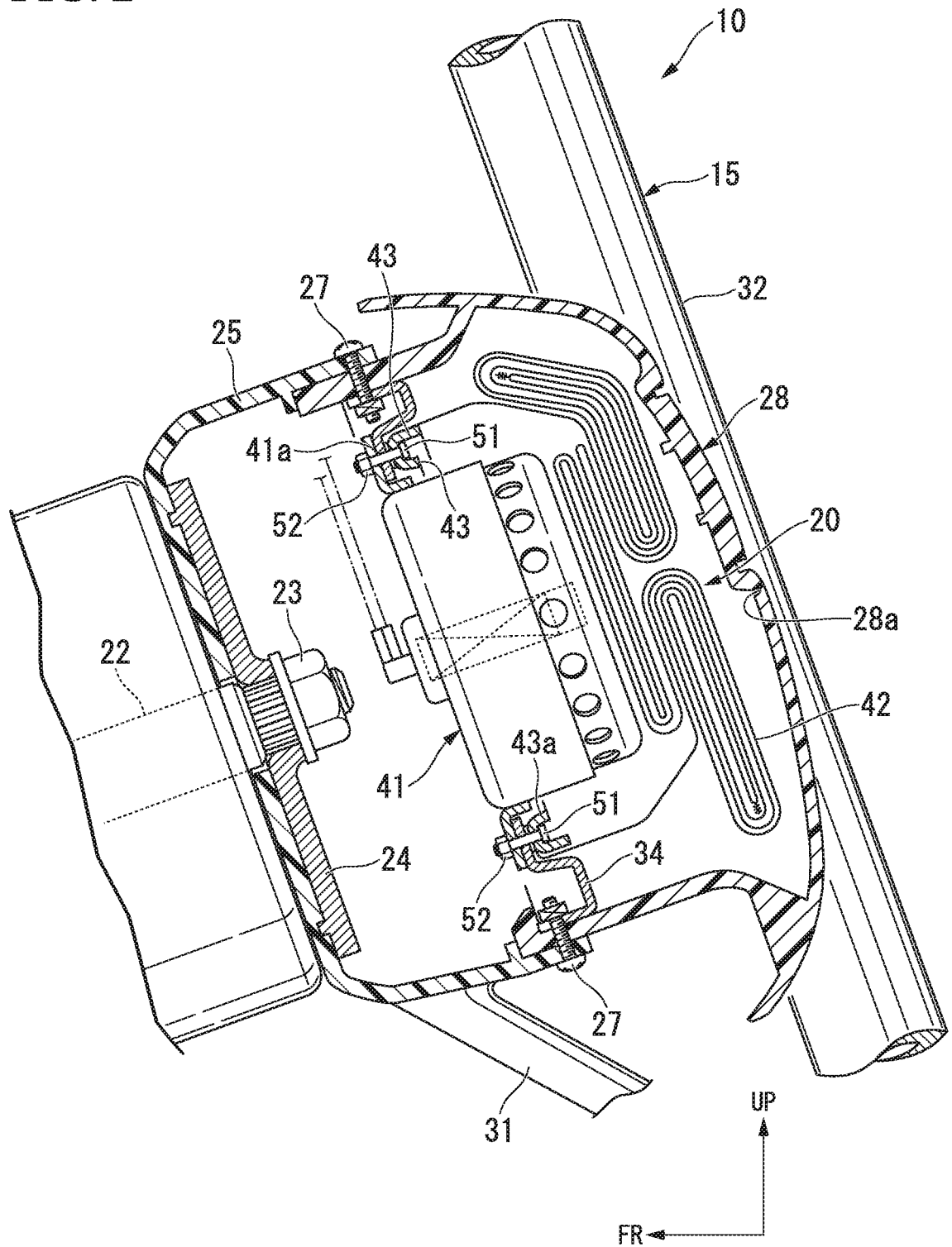
FIG. 2 is a cross-sectional view along a II-II line of FIG. 1 showing the airbag apparatus according to the embodiment of the present invention.

As shown in FIG. 2, the airbag apparatus 20 is stored in an inner part of the steering wheel 15. In the airbag apparatus 20, when an impact energy acts on the vehicle 10, a gas is introduced to an airbag bag body 42 from an inflator 41. By introducing the gas, the airbag bag body 42 is expanded at the vehicle body frontward part of a driver (hereinafter, referred to as a "passenger"), and thereby, the driver is restrained and protected by the airbag bag body 42.

In the steering wheel 15, a boss part 24 is fixed to a rear end part of a steering shaft 22 by a steering nut 23. A front cover 25 having a cup shape is fixed to the boss part 24. A rear cover 28 is fixed to a circumferential edge of the front cover 25 by a plurality of bolts 27 so as to close the front cover 25. A plurality of spoke parts 31 that radially extend are attached to an outer circumferential surface of the front cover 25. A steering wheel main body 32 is supported by the spoke part 31.

A retainer 34 along with the front cover 25 and the rear cover 28 is screwed together by the bolt 27 to an inner circumferential surface of the rear cover 28. The airbag apparatus 20 is supported by the retainer 34. The front cover 25 and the rear cover 28 constitute an airbag cover that stores the airbag apparatus 20.

A tear line 28a for facilitating breaking of the rear cover 28 at the time of inflation and expansion of the airbag bag body 42 is formed on an inner surface of the rear cover 28. The tear line 28a is formed, for example, in a H shape when seen from a front side of the rear cover 28. At the time of inflation and expansion of the airbag bag body 42, the rear cover 28 is broken along the tear line 28a. Thereby, the rear cover 28 is divided into an upper cover and a lower cover and is expanded.

Hereinafter, the airbag apparatus 20 is described in detail.

Figure 3:
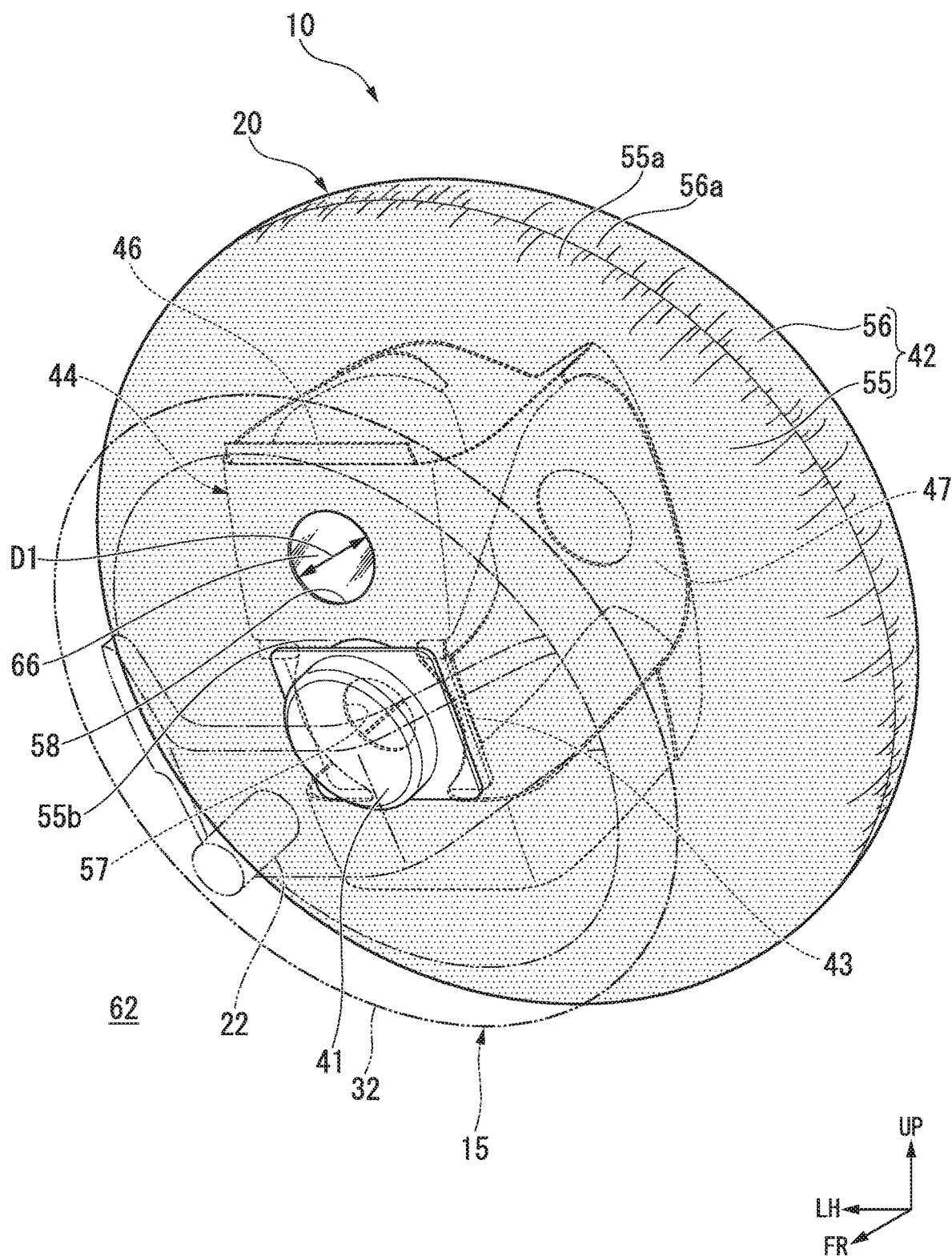
FIG. 3 is a perspective view showing the airbag apparatus according to the embodiment of the present invention.

As shown in FIG. 2 and FIG. 3, the airbag apparatus 20 includes the inflator 41, the airbag bag body 42, a fixation bracket 43, a steering-side foundation cloth 44, a reinforcement cloth 45 (refer to FIG. 6), a fixation part 46, and a passenger-side foundation cloth 47.

A propellant that generates a gas by burning is filled in the inflator 41. A flange 41a of the inflator 41 is arranged at a vehicle body frontward part of the retainer 34. A middle base part (specifically, a middle base part of a first foundation cloth 55 described below) 55b of the airbag bag body 42 is arranged at a vehicle body rearward part of the retainer 34. The middle base part 55b of the airbag bag body 42 is fixed to the retainer 34 by the fixation bracket 43.

The fixation bracket 43 is a bracket that fixes the middle base part 55b of the airbag bag body 42 and that has a ring shape. An inflator takeout opening 43a is opened on a middle part of the fixation bracket 43, and a plurality of attachment holes are formed around the inflator takeout opening 43a. The plurality of attachment holes are holes through which a bolt 51 penetrates.

The inflator 41 protrudes to the inside of the airbag bag body 42 from the inflator takeout opening 43a. The flange 41a, the retainer 34, and the fixation bracket 43 of the inflator 41 are overlapped with one another in sequence from the vehicle body frontward direction to the vehicle body rearward direction and are fastened by the bolt 51 and a nut 52.

Figure 4:
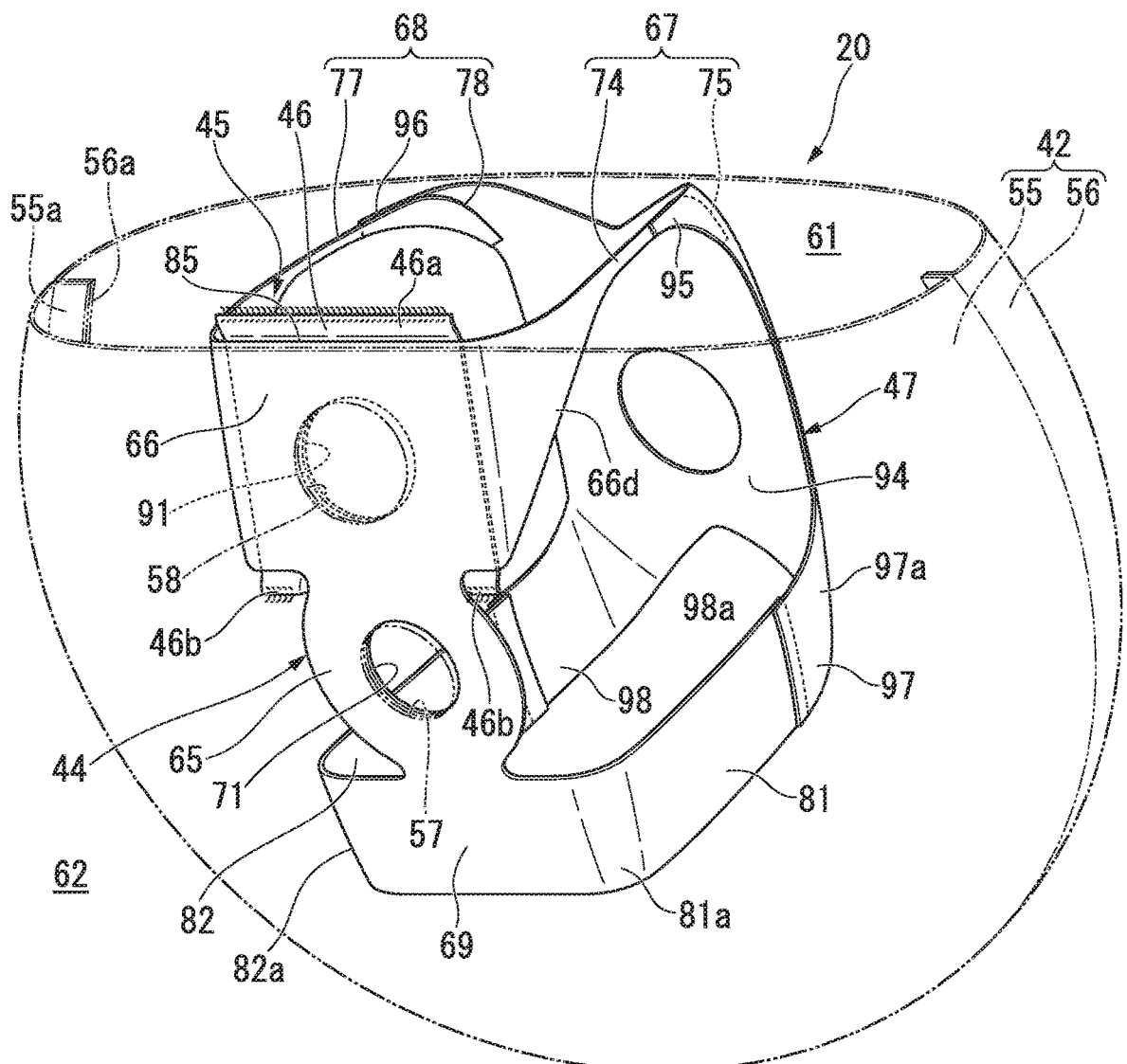
FIG. 4 is a perspective view showing a steering-side foundation cloth, a reinforcement cloth, and a passenger-side foundation cloth of the airbag apparatus according to the embodiment of the present invention.
Figure 4:
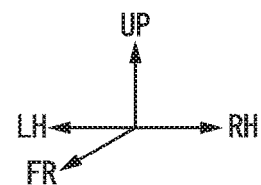

As shown in FIG. 3 and FIG. 4, the airbag bag body 42 is a bag body that is inflated and expanded by the gas that is generated by the inflator 41 being introduced to the airbag bag body 42. Specifically, the airbag bag body 42 includes the first foundation cloth 55 that is arranged on a vehicle body frontward side and a second foundation cloth 56 that is arranged on a vehicle body rearward side.

The first foundation cloth 55 and the second foundation cloth 56 are formed in a round shape in a plan view such that a circumferential edge part 55*a* of the first foundation cloth 55 and a circumferential edge part 56*a* of the second foundation cloth 56 are overlapped with each other.

The first foundation cloth 55 is a cloth having a round shape in a plan view. An inflator opening 57 and a vent hole 58 are formed on the first foundation cloth 55. The inflator opening 57 is formed in a round shape in the middle base part 55*b* of the first foundation cloth 55 so as to surround the inflator 41.

A plurality of penetration holes are formed around the inflator opening 57. The plurality of penetration holes are holes through which the bolt 51 (refer to FIG. 2) penetrates when attaching the inflator 41.

The first foundation cloth 55 is interposed between the retainer 34 (refer to FIG. 2) and the fixation bracket 43 and is fastened by a plurality of bolts 51. Thereby, the gas that is generated by the inflator 41 is supplied to the inside of the airbag bag body 42 from the inflator opening 57 at the middle part of the first foundation cloth 55. The vent hole 58 is arranged at an upper position of the inflator opening 57.

The vent hole 58 is opened in a round shape having an opening diameter (diameter) D1 so as to allow an inside 61 and an outside 62 of the airbag bag body 42 to communicate with each other.

The vent hole 58 is maintained in a closed state by being covered by a cover part 66 of the steering-side foundation cloth 44 at the time of inflation and expansion of the airbag bag body 42. On the other hand, the vent hole 58 is opened at the time of restraining the occupant after the inflation and expansion of the airbag bag body 42, and the gas at the inside 61 of the airbag bag body 42 is discharged to the outside 62.

The second foundation cloth 56 is a cloth that has a diameter similar to the diameter of the first foundation cloth 55 and that is formed in a round shape in a plan view. By overlapping the circumferential edge part 55*a* of the first foundation cloth 55 and the circumferential edge part 56*a* of the second foundation cloth 56 with each other and by sewing the circumferential edge part 55*a* and the circumferential edge part 56*a* with each other at a sewn part, the airbag bag body 42 is formed.

The steering-side foundation cloth 44, the reinforcement cloth 45, the fixation part 46, and the passenger-side foundation cloth 47 are provided at the inside 61 of the airbag bag body 42.

The first foundation cloth 55, the second foundation cloth 56, the steering-side foundation cloth 44, the reinforcement cloth 45, the fixation part 46, and the passenger-side foundation cloth 47 are formed of, for example, a cloth having flexibility, and a silicon coating is applied on one surface of the cloth.

Figure 5:
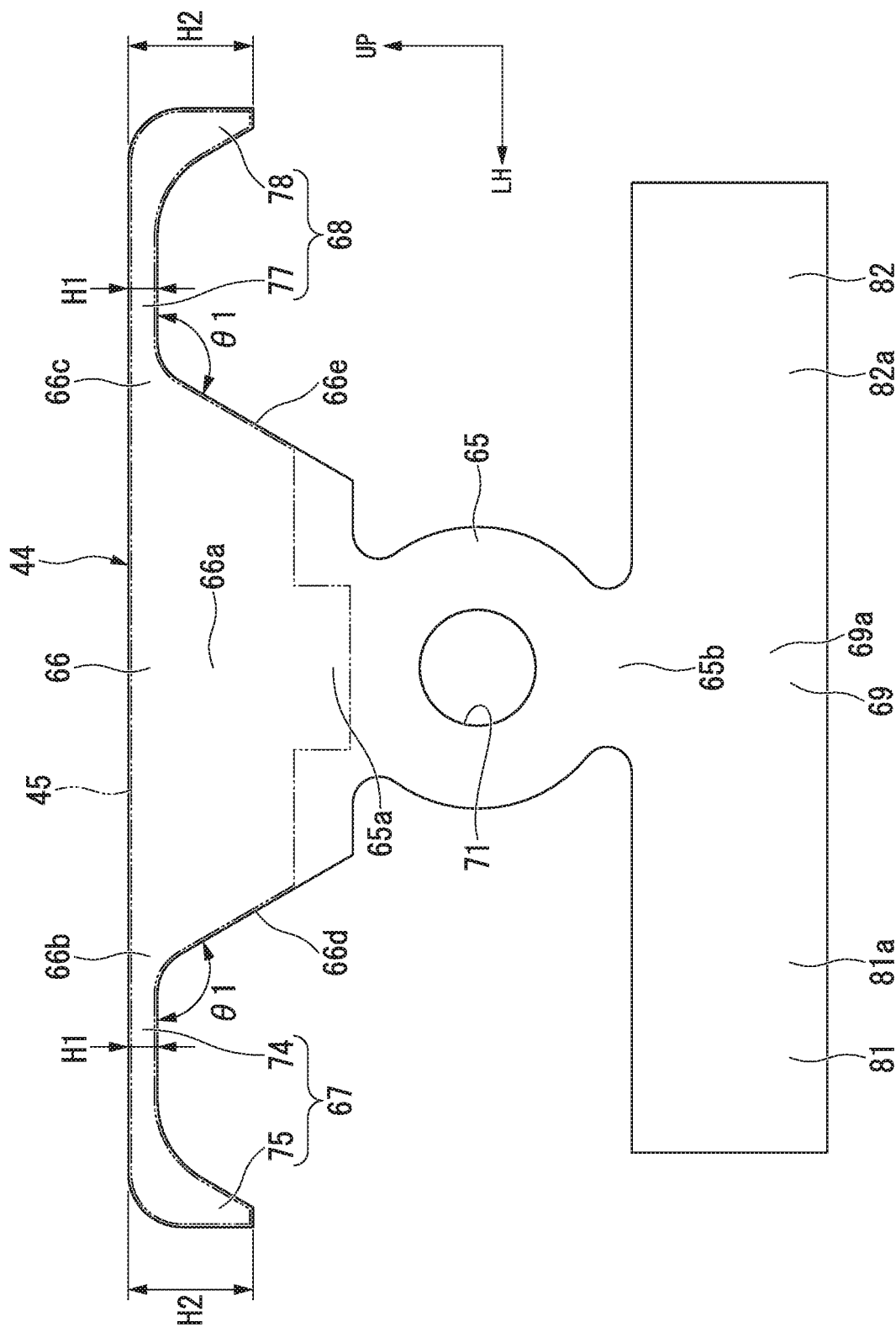
FIG. 5 is a plan view showing the steering-side foundation cloth of the airbag apparatus according to the embodiment of the present invention.

As shown in FIG. 4 and FIG. 5, the steering-side foundation cloth 44 has a first base part 65, a cover part 66, a first strap 67, a second strap 68, and a lower strap 69.

By forming the outer shape of the first base part 65 in a round shape and by opening an inflator insertion hole 71 at the center portion of the first base part 65, the first base part 65 is formed in a ring shape. The inflator insertion hole 71 is formed in a round shape that is the same as the shape of the inflator opening 57 of the first foundation cloth 55. The inflator insertion hole 71 is arranged so as to be overlapped with the inflator opening 57.

A plurality of attachment holes are formed around the inflator insertion hole 71. The plurality of attachment holes are formed so as to be overlapped with the plurality of penetration holes of the first foundation cloth 55. The plurality of attachment holes and the plurality of penetration holes of the first foundation cloth 55 are holes through which the bolt 51 (refer to FIG. 2) penetrates when attaching the inflator 41.

As shown in FIG. 2 and FIG. 3, the first base part 65 is interposed between the middle base part 55*b* (refer to FIG. 3) of the airbag bag body 42 and the fixation bracket 43, and the circumference of the inflator insertion hole 71 is integrally sewn to the middle base part 55*b* (that is, the first foundation cloth 55).

The fixation bracket 43 is fastened to the retainer 34 (refer to FIG. 2) and the flange 41*a* of the inflator 41 by the bolt 51 and the nut 52. In this state, the first base part 65 together with the middle base part 55*b* of the airbag bag body 42 is attached to the retainer 34 and the flange 41*a* of the inflator 41.

With reference back to FIG. 4 and FIG. 5, the cover part 66 is integrally formed on an upper portion 65*a* of the first base part 65. The cover part 66 is formed in a reversed trapezoidal shape. A cover middle part 66*a* of the cover part 66 is arranged at a position that is opposed to the vent hole 58. The vent hole 58 is covered by the cover part 66 from the inside 61 of the airbag bag body 42. That is, the cover part is a region that closes the vent hole 58 in an ordinary state until a predetermined bag inner pressure or more acts on the airbag bag body 42.

The first strap 67 is integrally connected to the left side of the cover part 66. The first strap 67 has a first narrow width strap part (narrow width part) 74 and a first sewn part 75. The first narrow width strap part 74 is connected to a left upper portion 66*b* of the cover part 66 and extends in a direction that is separated from the left upper portion 66*b*. The first narrow width strap part 74 is provided in a tensioned state toward a vehicle body rearward direction from the left upper portion 66*b* of the cover part 66 in a state where the airbag bag body 42 is inflated and expanded.

The first narrow width strap part 74 is formed such that a width H1 of the strap is smaller than an opening diameter D1 of the vent hole 58.

Specifically, it is preferable that the width H1 of the first narrow width strap part 74 is formed to be smaller than an opening diameter D1×(½).

The first sewn part 75 is connected to a front end portion of the first narrow width strap part 74. The first sewn part 75 is formed in a triangle shape so as to protrude downward. Accordingly, the first sewn part 75 is formed such that a height H2 of the first sewn part 75 is larger than the width H1 of the first narrow width strap part 74.

Thereby, it is possible to ensure a large sewing margin when sewing the first sewn part 75 to the passenger-side foundation cloth 47.

The second strap 68 is integrally connected to the right side of the cover part 66. The second strap 68 is formed symmetrically in a right-to-left direction to the first strap 67. That is, the second strap 68 has a second narrow width strap part (narrow width part) 77 and a second sewn part 78.

The second narrow width strap part 77 is connected to a right upper portion 66*c* of the cover part 66 and extends in a direction that is separated from the right upper portion 66*c*. The second narrow width strap part 77 is provided in a tensioned state toward the vehicle body rearward direction from the right upper portion 66*c* of the cover part 66 in a state where the airbag bag body 42 is inflated and expanded.

Similarly to the first narrow width strap part 74, the second narrow width strap part 77 is formed such that a width H1 of the strap is smaller than the opening diameter D1 of the vent hole 58.

Specifically, it is preferable that the width H1 of the second narrow width strap part 77 is formed to be smaller than an opening diameter D1×(½).

The second sewn part 78 is connected to a front end portion of the second narrow width strap part 77. The second sewn part 78 is formed in a triangle shape so as to protrude downward. Accordingly, similarly to the first sewn part 75, the second sewn part 78 is formed such that a height H2 of the second sewn part 78 is larger than the width H1 of the second narrow width strap part 77. Thereby, it is possible to ensure a large sewing margin when sewing the second sewn part 78 to the passenger-side foundation cloth 47.

A lower strap 69 is formed integrally with a lower part 65*b* of the first base part 65. The lower strap 69 has a third strap 81 and a fourth strap 82.

The third strap 81 is connected to a left side of a middle part 69*a* of the lower strap 69 and extends in a direction that is separated from the left side of the middle part 69*a*. The third strap 81 is provided in a tensioned state toward the vehicle body rearward direction from a middle portion 81*a* of the third strap 81 in a state where the airbag bag body 42 is inflated and expanded.

The fourth strap 82 is connected to a right side of the middle part 69*a* of the lower strap 69 and extends in a direction that is separated from the right side of the middle part 69*a*. The fourth strap 82 is provided in a tensioned state toward the vehicle body rearward direction from a middle portion 82*a* of the fourth strap 82 in a state where the airbag bag body 42 is inflated and expanded.

Figure 6:
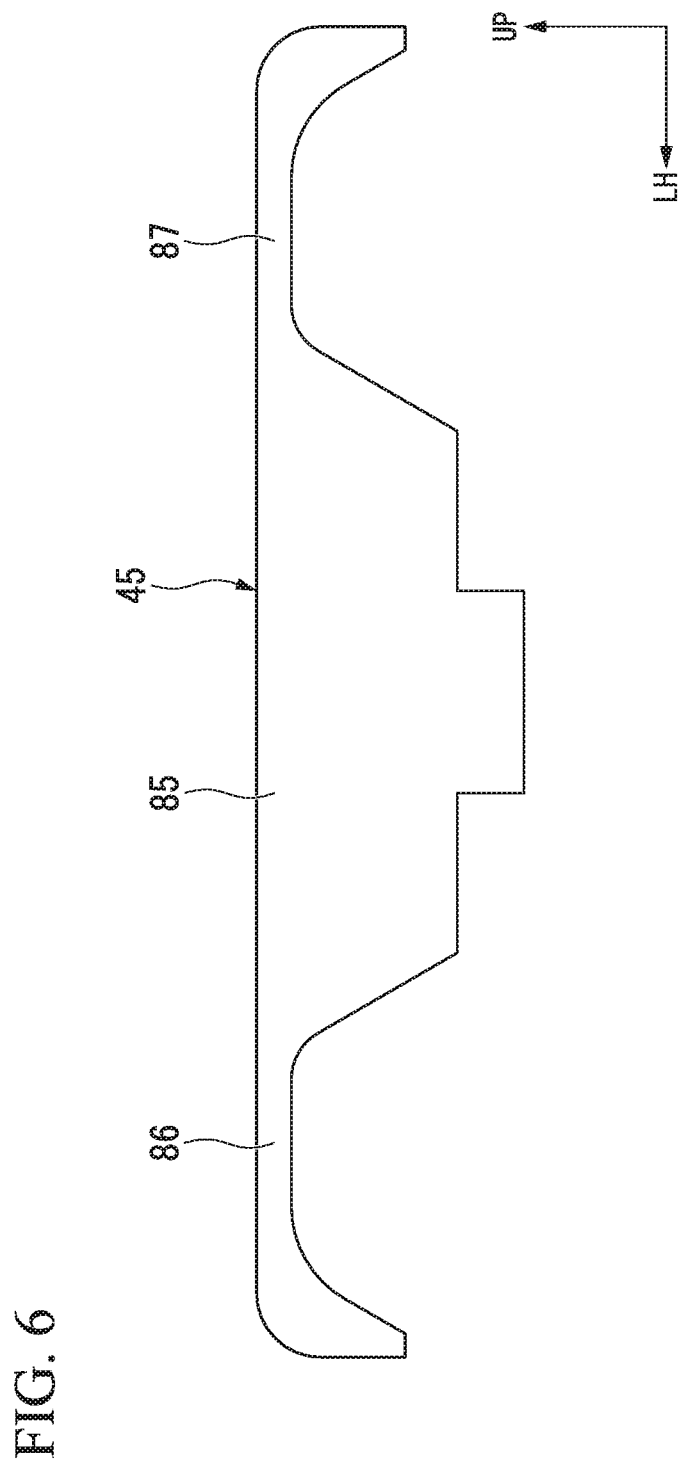
FIG. 6 is a plan view showing the reinforcement cloth of the airbag apparatus according to the embodiment of the present invention.

As shown in FIG. 5 and FIG. 6, the reinforcement cloth 45 is overlapped with the cover part 66, the first strap 67, and the second strap 68 of the steering-side foundation cloth 44. The reinforcement cloth 45 has a reinforcement cover part 85 that is overlapped with the cover part 66 from the inside 61 of the airbag bag body 42, a first reinforcement strap 86 that is overlapped with the first strap 67, and a second reinforcement strap 87 that is overlapped with the second strap 68.

The reinforcement cover part 85 is formed in the same shape as the cover part 66. The first reinforcement strap 86 is formed in the same shape as the first strap 67. Specifically, the width of a region that is overlapped with the first narrow width strap part 74 among the first reinforcement strap 86 is formed in the same size as the width H1 of the first narrow width strap part 74.

The first reinforcement strap 86 is overlapped with the first strap 67, and thereby, the first narrow width strap part 74 of the first strap 67 is reinforced by the first reinforcement strap 86.

The second reinforcement strap 87 is formed in the same shape as the second strap 68. Specifically, the width of a region that is overlapped with the second narrow width strap part 77 among the second reinforcement strap 87 is formed in the same size as the width H1 of the second narrow width strap part 77.

The second reinforcement strap 87 is overlapped with the second strap 68, and thereby, the second narrow width strap part 77 of the second strap 68 is reinforced by the second reinforcement strap 87.

In this way, the first narrow width strap part 74 of the first strap 67 is reinforced by the first reinforcement strap 86. Further, the second narrow width strap part 77 of the second strap 68 is reinforced by the second reinforcement strap 87.

Accordingly, it is possible to prevent the first narrow width strap part 74 and the second narrow width strap part 77 from being damaged or being broken when the airbag bag body 42 is inflated and expanded.

Thereby, it is possible to favorably secure the shape of the inflated and expanded airbag bag body 42 by the first narrow width strap part 74 and the second narrow width strap part 77, and it is possible to favorably restrain the occupant by the airbag bag body 42.

Hereinafter, in a state where the first reinforcement strap 86 and the first strap 67 are overlapped with each other, the width H1 of a region that corresponds to the first narrow width strap part 74 is referred to as a "width H1 of the first narrow width strap part 74" for ease of explanation and is described.

Further, in a state where the second reinforcement strap 87 and the second strap 68 are overlapped with each other, the width H1 of a region that corresponds to the second narrow width strap part 77 is referred to as a "width H1 of the second narrow width strap part 77" for ease of explanation and is described.

As shown in FIG. 4, the cover part 66 of the steering-side foundation cloth 44 and the reinforcement cover part 85 of the reinforcement cloth 45 are supported by the fixation part 46 to the first foundation cloth 55. The fixation part 46 is formed in a rectangular shape. An opening part 91 having a round shape is opened at a middle portion of the fixation part 46. The fixation part 46 is arranged so as to cover the cover part 66 and the reinforcement cover part 85 from the inside 61 of the airbag bag body 42.

In this state, an upper end portion 46*a* of the fixation part 46 is arranged above the cover part 66 and the reinforcement cover part 85. A lower end portion 46*b* of the fixation part 46 is arranged below the cover part 66 and the reinforcement cover part 85.

The upper end portion 46*a* of the fixation part 46 is sewn to the first foundation cloth 55. The lower end portion 46*b* of the fixation part 46 is sewn to the first foundation cloth 55 or the first base part 65. In this state, the opening part 91 of the fixation part 46 is arranged so as to be overlapped with the vent hole 58.

The cover part 66 and the reinforcement cover part 85 are supported by the fixation part 46 movably in a vehicle width direction (an arrow LH-RH direction in the right-to-left direction). That is, an end portion (that is, a left end portion 66*d*, a right end portion 66*e* (refer to FIG. 5)) in the vehicle width direction of the cover part 66 becomes an end portion in the movement direction of the cover part 66.

The cover part 66 is formed in a reversed trapezoidal shape, and thereby, the left end portion 66*d* and the right end portion 66*e* are formed in a sloped manner. Specifically, the left end portion 66*d* is formed in a sloped state to the left side toward the left upper portion 66*b* of the cover part 66 from the upper portion 65*a* side of the first base part 65. Accordingly, a cross angle θ1 of a cross portion of the left end portion 66*d* and the first narrow width strap part 74 is formed to be an obtuse angle.

The right end portion 66*e* is formed in a sloped state to the right side toward the right upper portion 66*c* of the cover part 66 from the upper portion 65*a* side of the first base part 65. Accordingly, a cross angle θ1 of a cross portion of the right end portion 66*e* and the second narrow width strap part 77 is formed to be an obtuse angle.

In a state where the vent hole 58 is closed by the cover part 66 and the reinforcement cover part 85, the gas is supplied to the inside 61 of the airbag bag body 42, and thereby, the airbag bag body 42 is inflated and expanded.

Accordingly, a tensile force to the vehicle body rearward direction is generated at the first narrow width strap part 74 and the second narrow width strap part 77.

It is conceivable that at this time, a stress concentrates on the cross portion between the left end portion 66d and the first narrow width strap part 74 and the cross portion between the right end portion 66e and the second narrow width strap part 77, and the cross portions are broken. Therefore, by allowing the cross angle θ1 of each cross portion to be an obtuse angle, it is possible to prevent the stress concentration and prevent each cross portion from being broken.

After the airbag bag body 42 is inflated and expanded, the occupant is restrained by the airbag bag body 42. The airbag bag body 42 is pressed toward the vehicle body frontward direction by the occupant. In this state, the cover part 66 and the reinforcement cover part 85 are pushed out to the outside 62 of the airbag bag body 42 via the vent hole 58.

It is conceivable that when the cover part 66 and the reinforcement cover part 85 are pushed out to the outside 62 from the vent hole 58, the end portion (that is, the left end portion 66d, the right end portion 66e (refer to FIG. 5)) in the movement direction of the cover part 66 is pushed out to the outside 62 from the vent hole 58.

Therefore, it is conceivable that the first strap 67 that is connected to the left end portion 66d of the cover part 66 is pushed out to the outside 62 from the vent hole 58. Similarly, it is conceivable that the second strap 68 that is connected to the right end portion 66e of the cover part 66 is pushed out to the outside 62 from the vent hole 58.

Therefore, the first strap 67 (that is, the first narrow width strap part 74) is connected to the left end portion 66d of the cover part 66. The second strap 68 (that is, the second narrow width strap part 77) is connected to the right end portion 66e of the cover part 66.

Accordingly, even when the first narrow width strap part 74 and the second narrow width strap part 77 are pushed out together with cover part 66 to the outside 62 from the vent hole 58, it is possible to favorably open the vent hole 58.

Thereby, for example, when the inflated and expanded airbag bag body 42 receives a press force by the occupant, it is possible to allow the gas at the inside 61 of the airbag bag body 42 to escape via the vent hole 58 to the outside 62.

The passenger-side foundation cloth 47 is connected by sewing to the first strap 67 and the second strap 68 (that is, the steering-side foundation cloth 44).

Figure 7:
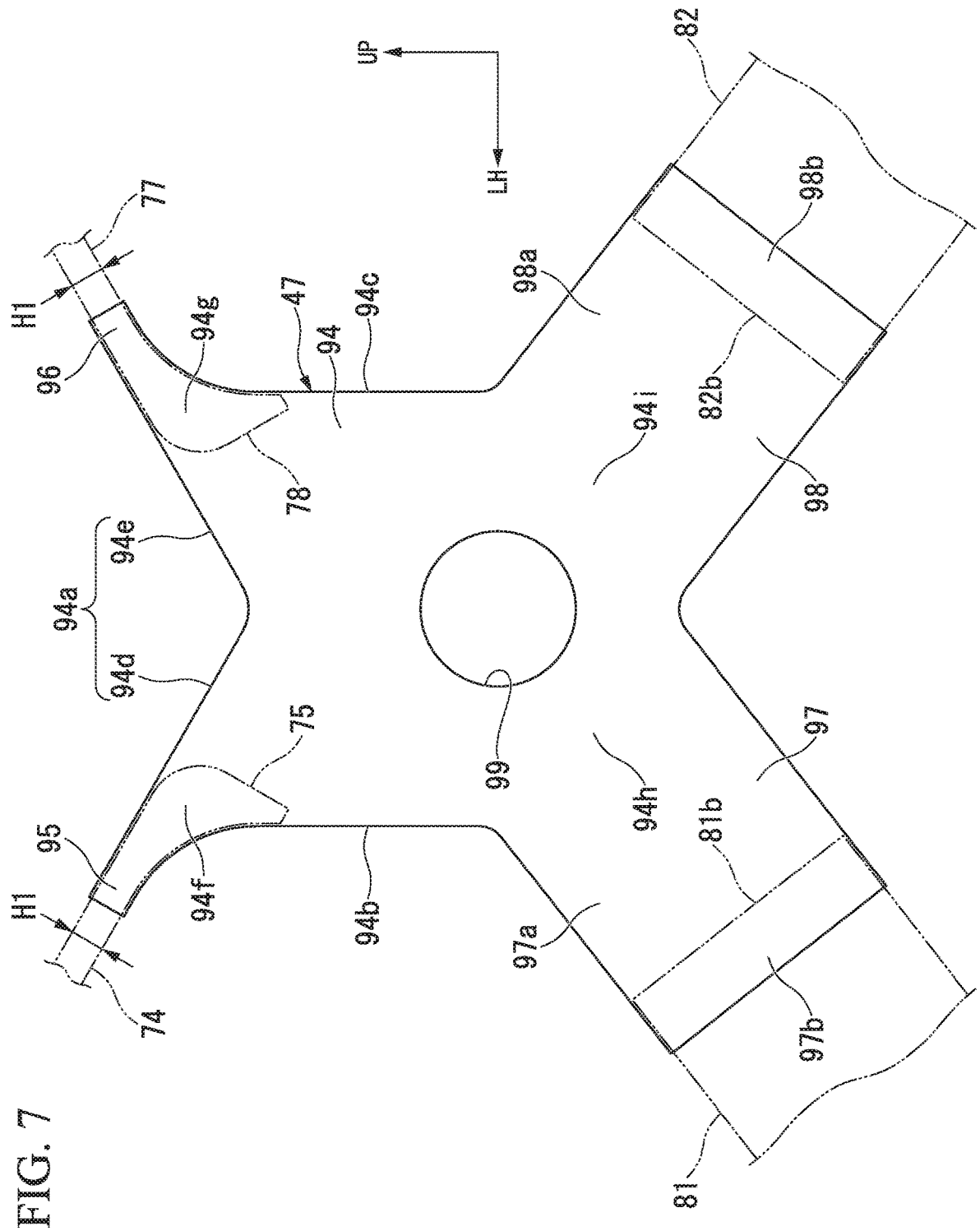
FIG. 7 is a plan view showing the passenger-side foundation cloth of the airbag apparatus according to the embodiment of the present invention.

As shown in FIG. 4 and FIG. 7, the passenger-side foundation cloth 47 has a second base part 94, a fifth strap 95, a sixth strap 96, a seventh strap 97, and an eighth strap 98.

The second base part 94 has an upper end portion 94a that is formed in a V shape, a left side portion 94b that extends vertically at the left side, a right side portion 94c that extends vertically at the right side, and a base opening portion 99 that is formed in a round shape at a substantially center position. The upper end portion 94a has a leftward upward sloped section 94d that is sloped leftward and upward and a rightward upward sloped section 94e that is sloped rightward and upward.

The second base part 94 is integrally sewn to the second foundation cloth 56 around the base opening portion 99.

The fifth strap 95 is connected to a left upper end portion 94f of the second base part 94. The fifth strap 95 extends in a sloped manner along an extension line of the leftward upward sloped section 94d from the left upper end portion 94f of the second base part 94. The fifth strap 95 is formed in the same width H1 as that of the first narrow width strap part 74 of the first strap 67.

The sixth strap 96 is connected to a right upper end portion 94g of the second base part 94. The sixth strap 96 extends in a sloped manner along an extension line of the rightward upward sloped section 94e from the right upper end portion 94g of the second base part 94. The sixth strap 96 is formed in the same width H1 as that of the second narrow width strap part 77 of the second strap 68.

The seventh strap 97 is connected to a left lower end portion 94h of the second base part 94 and extends in a sloped manner downward in a direction that is separated from the left lower end portion 94h. The seventh strap 97 is provided in a tensioned state toward the vehicle body frontward direction from a middle portion 97a of the seventh strap 97 in a state where the airbag bag body 42 is inflated and expanded. The seventh strap 97 is formed in the same width as that of the third strap 81.

The eighth strap 98 is connected to a right lower end portion 94i of the second base part 94 and extends in a sloped manner downward in a direction that is separated from the right lower end portion 94i. The eighth strap 98 is provided in a tensioned state toward the vehicle body frontward direction from a middle portion 98a of the eighth strap 98 in a state where the airbag bag body 42 is inflated and expanded. The eighth strap 98 is formed in the same width as that of the third strap 81.

The steering-side foundation cloth 44 and the passenger-side foundation cloth 47 are connected to each other.

As described above, the steering-side foundation cloth 44 is connected to the passenger-side foundation cloth 47 in a state where the reinforcement cloth 45 is overlapped with the cover part 66, the first strap 67, and the second strap 68. However, if the configuration of the airbag apparatus 20 is described in the state where the reinforcement cloth 45 is overlapped with the steering-side foundation cloth 44, the understanding of the configuration may be prevented. Therefore, for ease of understanding the configuration of the airbag apparatus 20, in the following description, the reinforcement cloth 45 is omitted.

In the first strap 67 of the steering-side foundation cloth 44, the first sewn part 75 is overlapped with the left upper end portion 94f of the second base part 94 of the passenger-side foundation cloth 47, and the left upper end portion 94f and the first sewn part 75 are sewn to each other. By sewing the first sewn part 75 to the left upper end portion 94f, it is possible to ensure a large sewing margin of the first sewn part 75. Accordingly, the first sewn part 75 is solidly connected to the left upper end portion 94f.

In the second strap 68 of the steering-side foundation cloth 44, the second sewn part 78 is overlapped with the right upper end portion 94g of the second base part 94 of the passenger-side foundation cloth 47, and the right upper end portion 94g and the second sewn part 78 are sewn to each other. By sewing the second sewn part 78 to the right upper end portion 94g, it is possible to ensure a large sewing margin of the second sewn part 78. Accordingly, the second sewn part 78 is solidly connected to the right upper end portion 94g.

A front end part 81b of the third strap 81 of the steering-side foundation cloth 44 is overlapped with a front end part 97b of the seventh strap 97 of the passenger-side foundation cloth 47. The front end part 81b of the third strap 81 and the front end part 97b of the seventh strap 97 are sewn to each other.

A front end part 82b of the fourth strap 82 of the steering-side foundation cloth 44 is overlapped with a front end part 98b of the eighth strap 98 of the passenger-side foundation cloth 47. The front end part 82b of the fourth strap 82 and the front end part 98b of the eighth strap 98 are sewn to each other. Thereby, the steering-side foundation cloth 44 and the passenger-side foundation cloth 47 are connected to each other.

Next, an example in which the airbag bag body 42 of the airbag apparatus 20 is inflated and expanded, and the occupant is favorably restrained is described with reference to FIG. 8A and FIG. 8B.

Figure 8A:
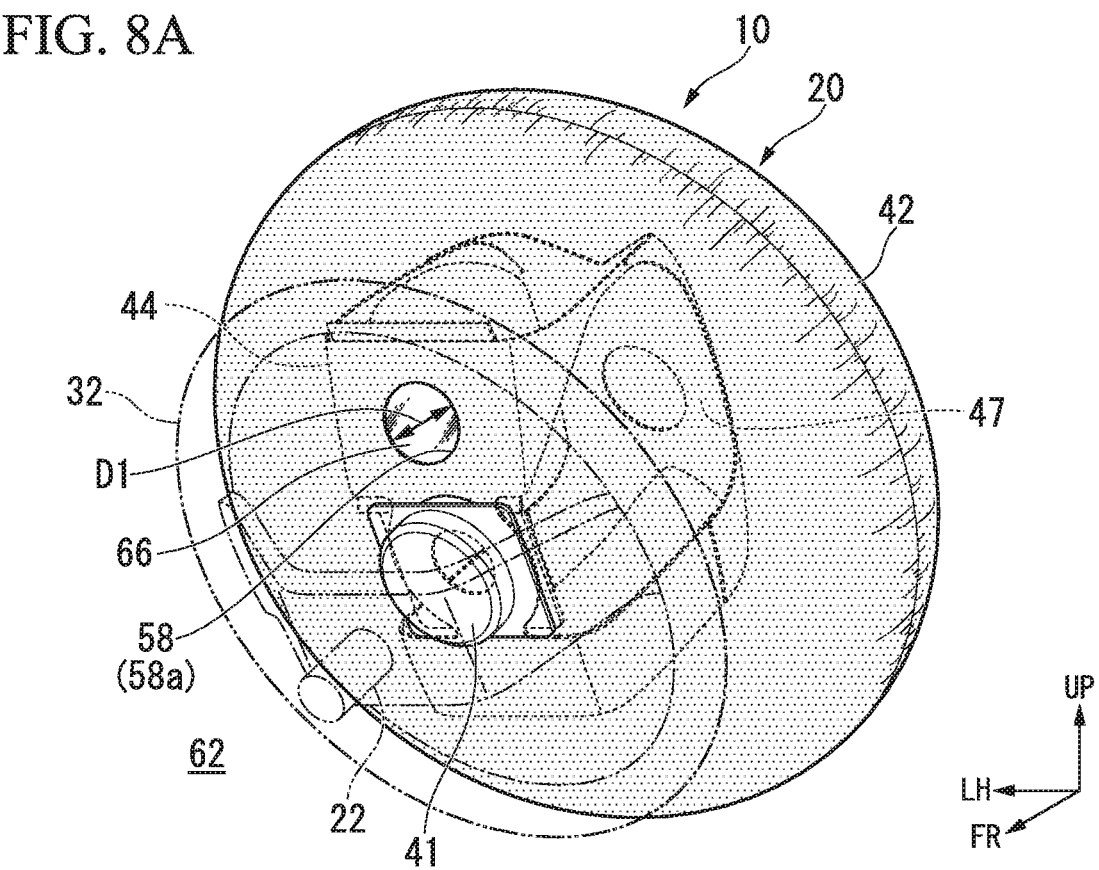
FIG. 8A is a perspective view showing an example of inflating and expanding an airbag bag body of the airbag apparatus according to the embodiment of the present invention.

As shown in FIG. 8A, acceleration of a predetermined value or more is detected due to collision of the vehicle 10. In this case, the inflator 41 is ignited, and a gas is supplied from the inflator 41 to the inside 61 (refer to FIG. 8B) of the folded airbag bag body 42. The gas is supplied to the inside 61 of the airbag bag body 42, and thereby, the airbag bag body 42 is inflated and expanded toward the vehicle body rearward direction.

The cover part 66 of the steering-side foundation cloth 44 is arranged at a position that corresponds to the vent hole 58 of the airbag bag body 42. Accordingly, since the gas is supplied to the inside 61 of the airbag bag body 42, the cover part 66 is pushed to and comes into close contact with a hole circumferential edge part 58a of the vent hole 58 by the inner pressure of the airbag bag body 42.

Thereby, during the inflation and expansion of the airbag bag body 42, the inner pressure of the airbag bag body 42 is instantly increased, and it is possible to promptly inflate and expand the airbag bag body 42. Further, in a state where the inflation and expansion of the airbag bag body 42 is completed, it is possible to prevent the gas from leaking to the outside 62 from the vent hole 58.

Figure 8B:
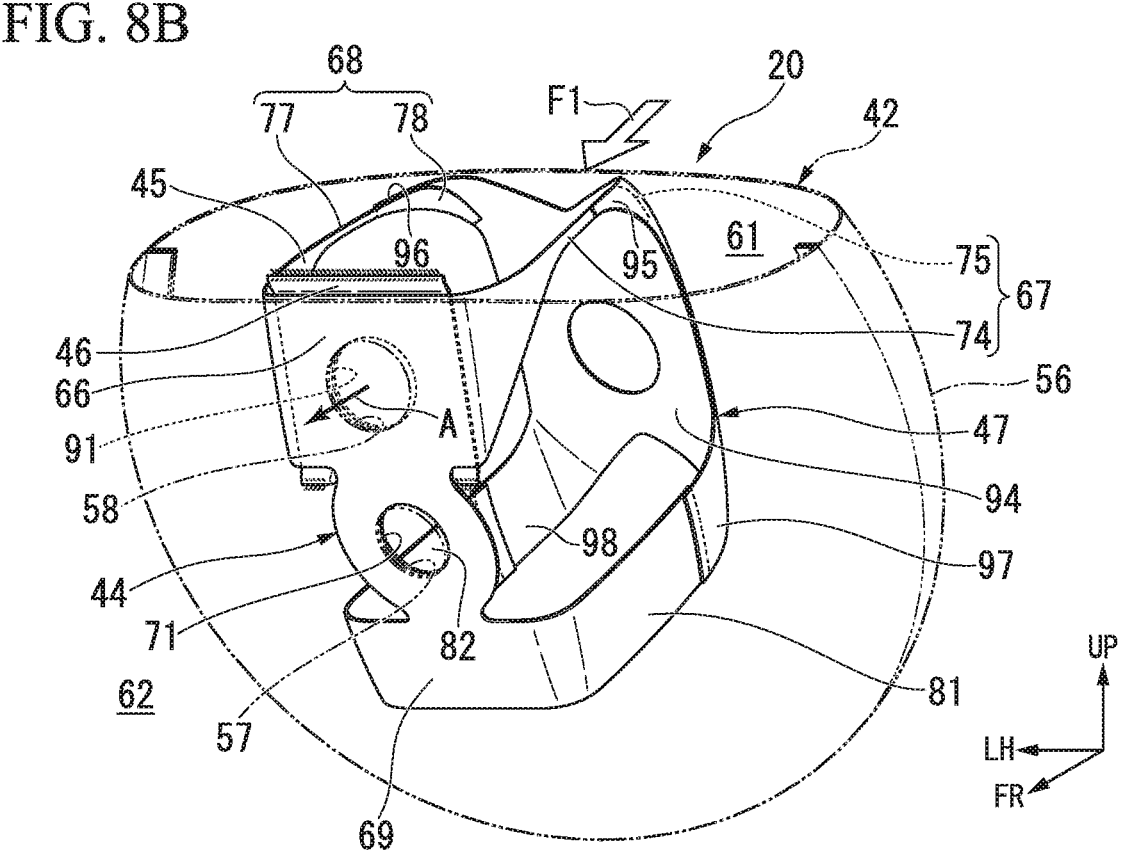
FIG. 8B is a perspective view showing an example of favorably restraining an occupant continuously by the airbag bag body of the airbag apparatus according to the embodiment of the present invention.

As shown in FIG. 8B, in a state where the airbag bag body 42 is inflated and expanded, the first strap 67 (specifically, the first narrow width strap part 74) and the fifth strap 95 are maintained in a tensioned state in the vehicle body front-to-rear direction. Further, the second strap 68 (specifically, the second narrow width strap part 77) and the sixth strap 96 are maintained in a tensioned state in the vehicle body front-to-rear direction.

Further, the third strap 81 and the seventh strap 97 are maintained in a tensioned state in the vehicle body front-to-rear direction. Further, the fourth strap 82 and the eighth strap 98 are maintained in a tensioned state in the vehicle body front-to-rear direction. Thereby, it is possible to favorably ensure the shape of the inflated and expanded airbag bag body 42 by the steering-side foundation cloth 44, the reinforcement cloth 45, and the passenger-side foundation cloth 47.

After the inflation and expansion of the airbag bag body 42, due to an inertial force at the time of vehicle collision, the occupant is moved toward the airbag bag body 42 and is restrained by the airbag bag body 42. In this state, a press force Fl toward the vehicle body frontward direction by the occupant acts on the airbag bag body 42.

The second foundation cloth 56 of the airbag bag body 42 is moved toward the vehicle body frontward direction, and the tensioned state of the first narrow width strap part 74 and the fifth strap 95 is released. The tensioned state of the second narrow width strap part 77 and the sixth strap 96 is released. The tensioned state of the third strap 81 and the seventh strap 97 is released. The tensioned state of the fourth strap 82 and the eighth strap 98 is released.

Additionally, the second foundation cloth 56 of the airbag bag body 42 is moved toward the vehicle body frontward direction, and thereby, due to the inner pressure of the airbag bag body 42, the cover part 66 is pushed out to the outside 62 of the airbag bag body 42 via the vent hole 58 as shown by an arrow A.

The cover part 66 is pushed out to the outside 62 of the airbag bag body 42, and thereby, the first narrow width strap part 74 and the second narrow width strap part 77 are pushed out to the outside of the airbag bag body 42 via the vent hole 58.

The widths H1 (refer to FIG. 5) of the first narrow width strap part 74 and the second narrow width strap part 77 are made smaller than the opening diameter D1 (refer to FIG. 8A) of the vent hole 58. Accordingly, even when the first narrow width strap part 74 and the second narrow width strap part 77 are pushed out to the outside 62 from the vent hole 58, it is possible to prevent the vent hole 58 from being closed by the first narrow width strap part 74 and the second narrow width strap part 77. That is, it is possible to keep the vent hole 58 in an opened state.

Thereby, it is possible to allow the gas of the airbag bag body 42 to escape via the vent hole 58 to the outside 62. Accordingly, it is possible to absorb the impact energy by the airbag bag body 42 and favorably restrain the occupant continuously.

Next, steering-side foundation cloths of first modified Example and second modified Example of the steering-side foundation cloth 44 of the embodiment are described with reference to FIG. 9 and FIG. 10. The member in first modified Example and second modified Example which is the same as or similar to that of the embodiment is given by the same reference numeral, and detailed description of the member is omitted.

FIRST MODIFIED EXAMPLE

Figure 9:
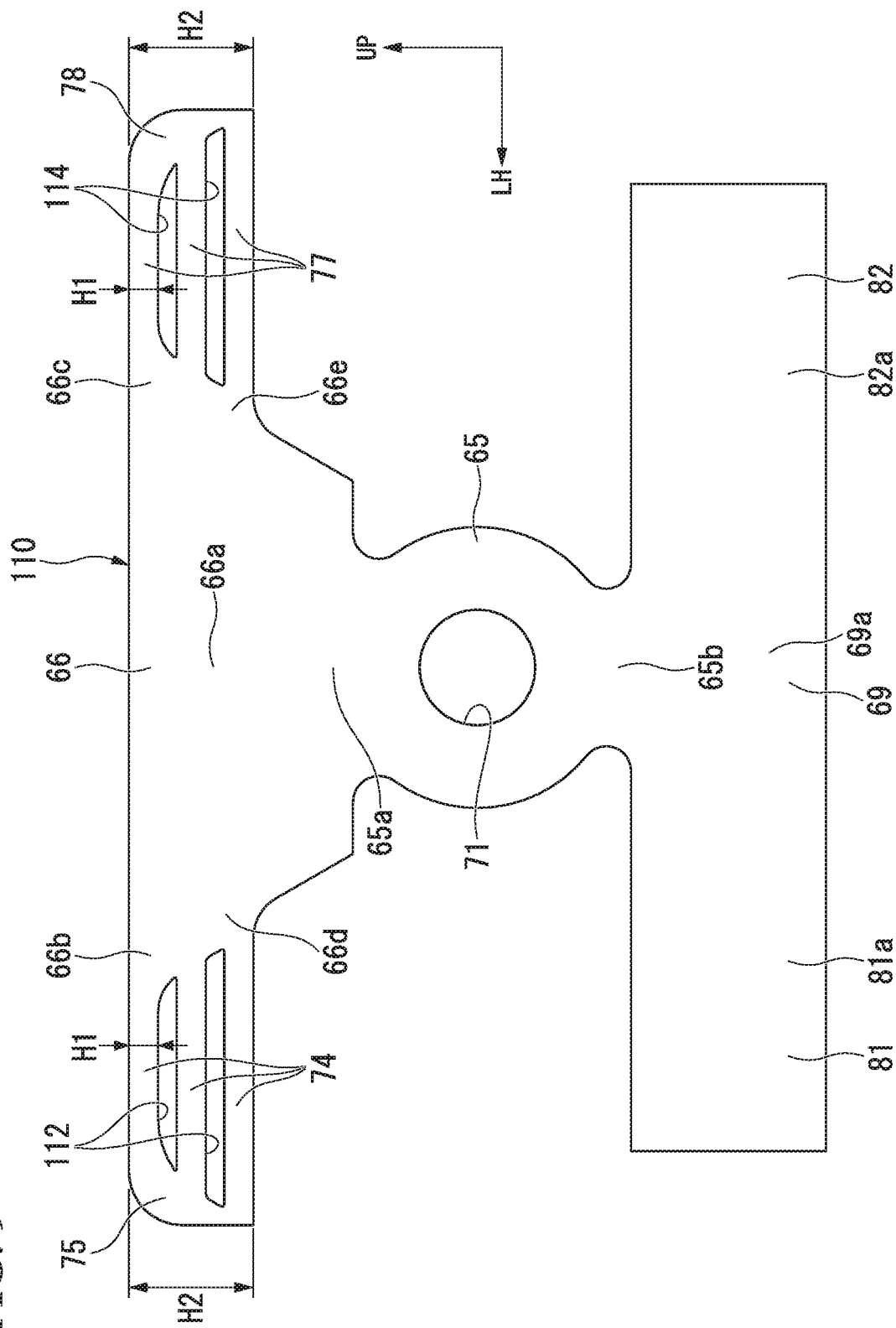
FIG. 9 is a plan view showing a steering-side foundation cloth of first modified Example of the airbag apparatus according to the embodiment of the present invention.

As shown in FIG. 9, a plurality of first narrow width strap parts 74 and a plurality of second narrow width strap parts 77 are provided on a steering-side foundation cloth 110. Other configurations of the steering-side foundation cloth 110 are similar to the steering-side foundation cloth 44 of the embodiment.

Specifically, the plurality of first narrow width strap parts 74 extend to the first sewn part 75 from the left upper portion 66b of the cover part 66 and the left end portion 66d of the cover part. By including the plurality of first narrow width strap parts 74, it is possible to further favorably ensure the strength of the plurality of first narrow width strap parts 74.

The plurality of first narrow width strap parts 74 are arranged to be spaced in the vertical direction. That is, a space 112 is ensured between the plurality of first narrow width strap parts 74.

The plurality of second narrow width strap parts 77 are formed symmetrically in the right-to-left direction to the plurality of first narrow width strap parts 74. The plurality of second narrow width strap parts 77 extend to the second sewn part 78 from the right upper portion 66c of the cover part 66 and the right end portion 66e of the cover part. By including the plurality of second narrow width strap parts 77, it is possible to further favorably ensure the strength of the plurality of second narrow width strap parts 77.

Similarly to the plurality of first narrow width strap parts 74, the plurality of second narrow width strap parts 77 are arranged to be spaced in the vertical direction. That is, a space 114 is ensured between the plurality of second narrow width strap parts 77.

The strengths of the plurality of first narrow width strap parts 74 and the plurality of second narrow width strap parts 77 are further favorably ensured, and thereby, it is not necessary to overlap the plurality of first narrow width strap parts 74 and the plurality of second narrow width strap parts 77 with a reinforcement cloth. Thereby, it is possible to reduce the number of components, and it is possible to simplify the configuration of the airbag apparatus 20.

Further, the space 112 is ensured between the plurality of first narrow width strap parts 74, and the space 114 is ensured between the plurality of second narrow width strap parts 77. Accordingly, even when the plurality of first narrow width strap parts 74 and the plurality of second narrow width strap parts 77 together with the cover part 66 are pushed out to the outside 62 (refer to FIG. 8B) from the vent hole 58, it is possible to prevent the vent hole 58 from being closed by the strap parts 74, 77. Thereby, it is possible to favorably open the vent hole 58.

In first modified Example, three straps are shown as an example of the plurality of first narrow width strap parts 74 and the plurality of second narrow width strap parts 77; however, it is possible to arbitrarily select the number of straps.

Further, in first modified Example, a state in which the plurality of first narrow width strap parts 74 and the plurality of second narrow width strap parts 77 are not overlapped with the reinforcement cloth is shown as an example; however, the embodiment is not limited thereto. For example, it is also possible to overlap the plurality of first narrow width strap parts 74 and the plurality of second narrow width strap parts 77 with the reinforcement cloth.

SECOND MODIFIED EXAMPLE

Figure 10:
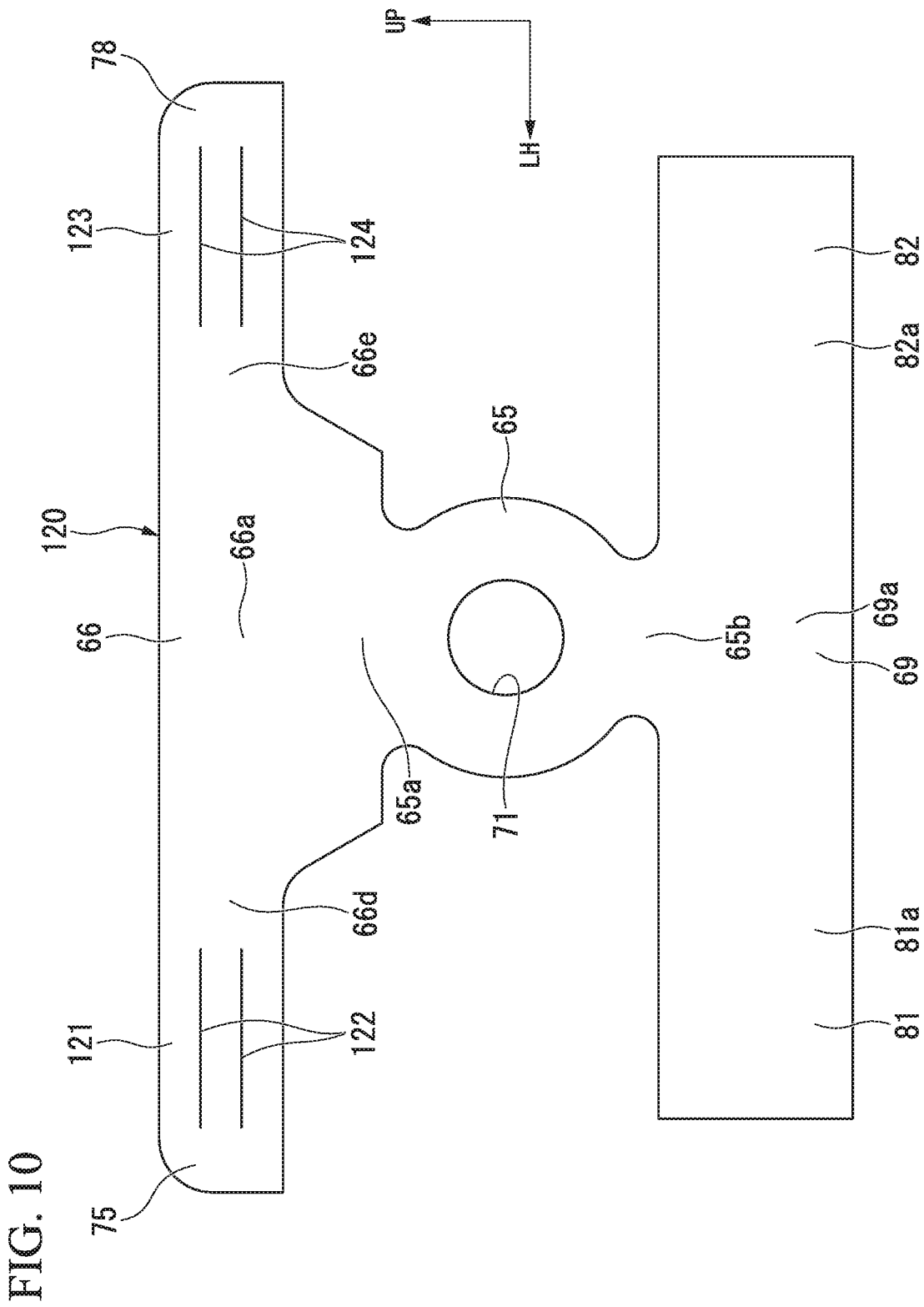
FIG. 10 is a plan view showing a steering-side foundation cloth of second modified Example of the airbag apparatus according to the embodiment of the present invention.

As shown in FIG. 10, in the steering-side foundation cloth 120, a first slit 122 is formed on a first strap 121, and a second slit 124 is formed on a second strap 123. Other configurations of the steering-side foundation cloth 120 are similar to the steering-side foundation cloth 44 of the embodiment.

Specifically, the first strap 121 is integrally connected to the left end portion 66d of the cover part 66 and extends in the left direction that is separated from the left end portion 66d. A plurality of first slits 122 are formed on the first strap 121. The plurality of first slits 122 are arranged to be spaced in the vertical direction and extend in the extension direction of the first strap 121.

The second strap 123 is integrally connected to the right end portion 66e of the cover part 66.

A plurality of second slits 124 are formed on the second strap 123. The plurality of second slits 124 are arranged to be spaced in the vertical direction and extend in the extension direction of the second strap 123.

In this way, the first slit 122 is formed on the first strap 121, and the second slit 124 is formed on the second strap 123. Thereby, when the first strap 121 and the second strap 123 are pushed out to the outside 62 (refer to FIG. 8B) from the vent hole 58, it is possible to further favorably open the vent hole 58 by the first slit 122 and the second slit 124.

In second modified Example, two slits are shown as an example of the plurality of first slits 122 and the plurality of second slits 124; however, the embodiment is not limited thereto. As other examples, it is possible to arbitrarily select the number of the plurality of first slits 122 and the plurality of second slits 124.

The technical scope of the present invention is not limited to the embodiment described above, and a variety of changes can be added without departing from the scope of the invention.

For example, the above embodiment is described using an example of the airbag apparatus 20 that is stored inside the steering wheel 15; however, the embodiment is not limited thereto. As other examples, it is also possible to apply to other airbags such as a knee airbag apparatus that is stored in the instrument panel and that protects the knee of the occupant and a side airbag apparatus that is stored in a roof rail and that is inflated and expanded at the side part of the vehicle room.

Further, the above embodiment is described using an example in which the steering-side foundation cloth 44 (specifically, the cover part 66, the first strap 67, and the second strap 68) is overlapped with the reinforcement cloth 45; however, the embodiment is not limited thereto. As other examples, for example, it is also possible to use a configuration in which the steering-side foundation cloth 44 is not overlapped with the reinforcement cloth 45.

What is claimed is:

1. An airbag apparatus in which an airbag bag body is inflated and expanded by a gas that is supplied from an inflator, the apparatus comprising:
   a cover that covers a vent hole from an inner part of the airbag bag body, the vent hole being formed on the airbag bag body;
   a fixation part that supports the cover movably; and
   a plurality of straps that are connected to the cover, each of the plurality of straps including a narrow width part,
   wherein a width of each of the narrow width parts of the plurality of straps is smaller than a diameter of the vent hole,
   the plurality of straps connected to both end parts of the cover in a movement direction thereof toward a longitudinal direction of the plurality of straps, and
   at a time of vehicle collision, when the airbag bag body of the vehicle is inflated and expanded and an occupant of the vehicle is restrained by the airbag bag body, each of the narrow width parts of the plurality of straps is configured to be pushed out to an outside of the airbag bag body via the vent hole.

2. The airbag apparatus according to claim 1, wherein the plurality of straps are reinforced by a reinforcement cloth.

* * * * *